(12) United States Patent
Gu et al.

(10) Patent No.: US 11,170,050 B1
(45) Date of Patent: Nov. 9, 2021

(54) METHOD AND DEVICE FOR GRAPH DATA QUALITY VERIFICATION

(71) Applicant: Shanghai IceKredit, Inc., Shanghai (CN)

(72) Inventors: Lingyun Gu, Shanghai (CN); Zhipan Guo, Shanghai (CN); Wei Wang, Shanghai (CN); Haiquan Li, Shanghai (CN); Xiaofeng Zhang, Shanghai (CN)

(73) Assignee: Shanghai IceKredit, Inc., Shanghai (CN)

( * ) Notice: Subject to any disclaimer, the term of this patent is extended or adjusted under 35 U.S.C. 154(b) by 0 days.

(21) Appl. No.: 17/229,002

(22) Filed: Apr. 13, 2021

(30) Foreign Application Priority Data

Jun. 11, 2020 (CN) .......................... 202010526495.7

(51) Int. Cl.
| | | |
|---|---|---|
| *G06F 16/90* | (2019.01) | |
| *G06F 16/24* | (2019.01) | |
| *G06F 16/28* | (2019.01) | |
| *G06K 9/62* | (2006.01) | |
| *G06F 16/901* | (2019.01) | |
| *G06F 16/2455* | (2019.01) | |

(52) U.S. Cl.
CPC .... *G06F 16/9024* (2019.01); *G06F 16/24568* (2019.01); *G06F 16/288* (2019.01); *G06K 9/6284* (2013.01)

(58) Field of Classification Search
CPC ........... G06F 16/9024; G06F 16/24568; G06F 16/288; G06K 9/6284
See application file for complete search history.

(56) References Cited

U.S. PATENT DOCUMENTS 10,339,179 B2 *  7/2019  Yousfi ................. G06F 16/9024
2018/0081986 A1 *  3/2018  Sitik ....................... G06N 20/00
(Continued)

FOREIGN PATENT DOCUMENTS

CN     101291289 B     7/2013
CN     107016210 A     8/2017
(Continued)

OTHER PUBLICATIONS

De Virgilio, Roberto, Antonio Maccioni, and Riccardo Torlone. "Converting relational to graph databases." First International Workshop on Graph Data Management Experiences and Systems. 2013. (Year: 2013).*

(Continued)

*Primary Examiner* — Mohsen Almani
(74) *Attorney, Agent, or Firm* — Westbridge IP LLC

(57) ABSTRACT

Disclosed are a method and a device for graph data quality verification, which can perform quality verification of the graph data to be processed before importing the graph data to be processed to the target graph database, thereby avoiding generating a target list based on the graph data to be processed with errors. By determining whether there is an outlier in the target list, the abnormal graph data in the graph data to be processed can be detected to ensure the correctness of the graph data to be processed imported into the target graph database. By generating a graph data quality report, it is possible to verify whether the graph data to be processed has errors during the import process.

3 Claims, 3 Drawing Sheets

(56) References Cited

U.S. PATENT DOCUMENTS

2018/0232403 A1* 8/2018 Bhatti ................ G06F 16/252
2018/0247012 A1   8/2018 Verzotto et al.

FOREIGN PATENT DOCUMENTS

CN   107256247 A   10/2017
CN   108447534 A   8/2018

OTHER PUBLICATIONS

Akoglu, Leman, Mary McGlohon, and Christos Faloutsos. "Oddball: Spotting anomalies in weighted graphs." Pacific-Asia conference on knowledge discovery and data mining. Springer, Berlin, Heidelberg, 2010. (Year: 2010).*

Xirogiannopoulos, Konstantinos, and Amol Deshpande. "Extracting and analyzing hidden graphs from relational databases." Proceedings of the 2017 ACM International Conference on Management of Data. 2017. (Year: 2017).*

Müller, Emmanuel, et al. "Ranking outlier nodes in subspaces of attributed graphs." 2013 IEEE 29th International Conference on Data Engineering Workshops (ICDEW). IEEE, 2013. (Year: 2013).*

First Office Action in counterpart Chinese Patent Application No. 202010526495.7, dated Jul. 24, 2020.

* cited by examiner

METHOD AND DEVICE FOR GRAPH DATA QUALITY VERIFICATION

CROSS REFERENCE TO RELATED APPLICATIONS

The present disclosure claims the priority of Chinese Patent application No. 202010526495.7, filed on Jun. 11, 2020 and entitled "METHOD AND DEVICE FOR GRAPH DATA QUALITY VERIFICATION", which is hereby incorporated by reference in its entirety.

TECHNICAL FIELD

The present disclosure relates to the technical field of graph data processing, in particular, to a method for graph data quality verification and a device for graph data quality verification.

BACKGROUND

With the rapid development of social, e-commerce, finance, retail, Internet of Things and other industries, modern equipment has woven a huge and complex data network, traditional databases are difficult to deal with the relational operations between these data, and there is an urgent need for a database that supports the relational operations of massive and complex data. Based on this, the graph database came into being. The graph database can store and query data in a "graph" data structure. The "graph" consists of two elements: nodes and relationships. Each node represents an entity (e.g., people, places, things, categories, or other data), each relationship (e.g., node edge) represents the way two nodes are associated, and this common structure can model various scenarios to achieve relational operations on massive amounts of complex data. When building a graph database, the source data is usually imported directly into the graph database, which will affect the efficiency of the graph database and make it difficult to ensure the quality of the graph data in the graph database.

SUMMARY

In order to solve the above problem, the present disclosure provides a method for graph data quality verification and a device for graph data quality verification.

The present disclosure provides a method for graph data quality verification, including:

acquiring a first table structure information of a target database, and acquiring graph data to be processed and a second table structure information of the graph data to be processed from a preset data pool, where the target database is a graph database;

comparing the first table structure information with the second table structure information, and determining whether the graph data to be processed meets a list fusion condition;

in a determination that the graph data to be processed meets the list fusion condition, fusing the graph data to be processed to obtain a target list, where the target list includes graph data nodes and node edges;

determining whether there is an outlier in the target list according to the graph data nodes and the node edges in the target list, where the outlier includes at least one of a first outlier configured to characterize node degrees of the graph data nodes and a second outlier configured to characterize numbers of members of connected graphs of the graph data to be processed;

in a determination that there is no outlier in the target list, importing the graph data to be processed into the target database; and comparing the graph data to be processed in the target database with the graph data to be processed in the preset data pool, and generating a graph data quality report according to a comparison result.

Further, comparing the first table structure information with the second table structure information, and determining whether the graph data to be processed meets a list fusion condition includes:

comparing whether a first field type of a table node in the first table structure information is consistent with a second field type of a table node in the second table structure information;

in a determination that the first field type is consistent with the second field type, determining whether a field of each table node in the first table structure information is unique in the second table structure information;

in a determination that the field of each table node in the first table structure information is unique in the second table structure information, querying whether there are a first identification information of a start node of the graph data to be processed and a second identification information of an end node of the graph data to be processed in the first table structure information; and in a determination that there are the first identification information of the start node of the graph data to be processed and the second identification information of the end node of the graph data to be processed in the first table structure information, determining that the graph data to be processed meets the list fusion condition.

Further, the method further includes:

in a determination that the graph data to be processed does not meet the list fusion condition, generating an error prompt message to indicate that there is an error in the graph data to be processed.

Further, the method further includes:

in a determination that the graph data to be processed does not meet the list fusion condition, executing a pre-configured automatic repair script to repair the graph data to be processed.

Further, determining whether there is an outlier in the target list according to the graph data nodes and the node edges in the target list includes:

determining a cumulative value of node edges corresponding to each graph data node in the target list, and taking the cumulative value as a node degree of each graph data node;

according to an order of the node degrees from large to small, sorting the graph data nodes to obtain a sorting result of the graph data nodes;

dividing the graph data nodes in the target list according to a set proportion and the sorting result of the graph data nodes, and obtaining a first graph data node set and a second graph data node set, where the first graph data node set includes multiple sorted top graph data nodes, and the second graph data node set includes multiple sorted back graph data nodes;

calculating an average node degree corresponding to the second graph data node set; and determining whether a first ratio between a minimum node degree in the first graph data node set and the average node degree reaches a set ratio, in a determination that the first ratio between the minimum node degree in the first graph data node set and the average node degree reaches the set ratio, determining that there is the first outlier in the target list.

Further, determining whether there is an outlier in the target list according to the graph data nodes and the node edges in the target list includes:

generating connected graphs corresponding to the target list according to each graph data node in the target list and node edges corresponding to the each graph data node, where each connected graph includes multiple graph data nodes, and the multiple graph data nodes in each connected graph are connected by node edges;

calculating a number of members of each connected graph, wherein the number of members is a number of graph data nodes in each connected graph;

sorting the connected graphs in an order of the number of members from large to small to obtain a sorting result of the connected graphs;

dividing the connected graphs according to a set proportion and the sorting result of the connected graphs, and obtaining a first connected graph set and a second connected graph set, where the first connected graph set includes multiple sorted top connected graphs, and the second connected graph set includes multiple sorted back connected graphs;

calculating an average number of members corresponding to the second connected graph set; and determining whether a second ratio between a minimum number of members in the first connected graph set and the average number of members reaches a set ratio, in a determination that the second ratio between the minimum number of members in the first connected graph set and the average number of members reaches the set ratio, determining that there is the second outlier in the target list.

The present disclosure further provides a device for graph data quality verification, including:

an information acquisition module configured for acquiring a first table structure information of a target database, and acquiring graph data to be processed and a second table structure information of the graph data to be processed from a preset data pool, where the target database is a graph database;

a condition judgment module configured for comparing the first table structure information with the second table structure information, and determining whether the graph data to be processed meets a list fusion condition;

a data fusion module configured for in a determination that the graph data to be processed meets the list fusion condition, fusing the graph data to be processed to obtain a target list, where the target list includes graph data nodes and node edges;

an outlier detection module configured for determining whether there is an outlier in the target list according to the graph data nodes and the node edges in the target list, where the outlier includes at least one of a first outlier configured to characterize node degrees of the graph data nodes and a second outlier configured to characterize numbers of members of connected graphs of the graph data to be processed;

a data import module configured for in a determination that there is no outlier in the target list, importing the graph data to be processed into the target database; and a report generation module configured for comparing the graph data to be processed in the target database with the graph data to be processed in the preset data pool, and generating a graph data quality report according to a comparison result.

Further, the condition judgment module is specifically configured for:

comparing whether a first field type of a table node in the first table structure information is consistent with a second field type of a table node in the second table structure information;

in a determination that the first field type is consistent with the second field type, determining whether a field of each table node in the first table structure information is unique in the second table structure information;

in a determination that the field of each table node in the first table structure information is unique in the second table structure information, querying whether there are a first identification information of a start node of the graph data to be processed and a second identification information of an end node of the graph data to be processed in the first table structure information; and in a determination that there are the first identification information of the start node of the graph data to be processed and the second identification information of the end node of the graph data to be processed in the first table structure information, determining that the graph data to be processed meets the list fusion condition.

Further, the outlier detection module is specifically configured for:

determining a cumulative value of node edges corresponding to each graph data node in the target list, and taking the cumulative value as a node degree of each graph data node;

according to an order of the node degrees from large to small, sorting the graph data nodes to obtain a sorting result of the graph data nodes;

dividing the graph data nodes in the target list according to a set proportion and the sorting result of the graph data nodes, and obtaining a first graph data node set and a second graph data node set, where the first graph data node set includes multiple sorted top graph data nodes, and the second graph data node set includes multiple sorted back graph data nodes;

calculating an average node degree corresponding to the second graph data node set; and determining whether a first ratio between a minimum node degree in the first graph data node set and the average node degree reaches a set ratio, in a determination that the first ratio between the minimum node degree in the first graph data node set and the average node degree reaches the set ratio, determining that there is the first outlier in the target list.

Further, the outlier detection module is specifically configured for:

generating connected graphs corresponding to the target list according to each graph data node in the target list and node edges corresponding to the each graph data node, where each connected graph includes multiple graph data nodes, and the multiple graph data nodes in each connected graph are connected by node edges;

calculating a number of members of each connected graph, where the number of members is a number of graph data nodes in each connected graph;

sorting the connected graphs in an order of the number of members from large to small to obtain a sorting result of the connected graphs;

dividing the connected graphs according to a set proportion and the sorting result of the connected graphs, and obtaining a first connected graph set and a second connected graph set, where the first connected graph set includes multiple sorted top connected graphs, and the second connected graph set includes multiple sorted back connected graphs;

calculating an average number of members corresponding to the second connected graph set; and determining whether a second ratio between a minimum number of members in the first connected graph set and the average number of members reaches a set ratio, in a determination that the second ratio between the minimum number of members in the first connected graph set and the average number of members reaches the set ratio, determining that there is the second outlier in the target list.

Compared with the prior art, the method and device for graph data quality verification have the following technical effects:

By comparing the obtained first table structure information with the second table structure information in advance to determine whether the obtained data to be processed meets the list fusion condition, and fusing the graph data to be processed to obtain the target list when the list fusion condition is met, the quality verification of the graph data to be processed can be carried out before importing the graph data to be processed to the target graph database, thereby avoiding generating a target list based on the graph data to be processed with errors. By determining whether there is an outlier in the target list, the abnormal graph data in the graph data to be processed can be detected to ensure the correctness of the graph data to be processed imported into the target graph database. By generating a graph data quality report, it is possible to verify whether the graph data to be processed has errors during the import process. In this way, the verification of data quality can be realized before importing the graph data to be processed and during the process of importing the graph data to be processed, so as to avoid repeated import and cleaning of the graph data to be processed, thereby improving the efficiency of building the graph database and ensure the quality of the graph data in the graph database.

BRIEF DESCRIPTION OF THE DRAWINGS

In order to more clearly describe the technical solutions in the embodiments of the present disclosure, the following will briefly introduce the drawings that need to be used in the description of the embodiments. It should be understood that, the following drawings only show some embodiments of the present disclosure, and therefore should not be regarded as a limitation of the scope. For those of ordinary skill in the art, without creative work, other relevant drawings may also be obtained based on these drawings.

DETAILED DESCRIPTION OF THE EMBODIMENTS

In order to better understand the above technical scheme, the technical scheme of the present disclosure is described in detail below through the drawings and specific embodiments. It should be understood that the embodiments of the present disclosure and the specific features in the embodiments are the detailed description of the technical scheme of the present disclosure, rather than the limitation of the technical scheme of the present disclosure. In the case of no conflict, the embodiments of the present disclosure and the technical features in the embodiments may be combined with each other.

When importing the source data directly into the graph database for the construction of the graph database, if the graph database sends out an error signal, the error data will be found and repaired according to the error signal, then the source data in the graph database will be cleaned and the (repaired) source data will be imported again, which will repeatedly import and clean the source data, thus affecting the efficiency of the construction of the graph database.

In addition, after the import of the source data is completed, it is difficult to ensure the quality of the graph data in the graph database because there is no quality verification of the graph data in the graph database.

In order to solve the above problem, the present disclosure provides a method for graph data quality verification and a device for graph data quality verification, which can improve the efficiency of constructing the graph database and ensure the quality of the graph data in the graph database.

In the present disclosure, the graph data may be data related to the enterprise, such as enterprise business data, enterprise investment data, and enterprise legal person data, etc. There is a data association between these data, therefore, these data can be represented in the form of graph data, and then imported into the graph database for subsequent use.

Figure 1:
FIG. 1 is a flowchart of a method for graph data quality verification according to an embodiment of the present disclosure.

FIG. 1 provides a flowchart of a method for graph data quality verification, which includes the following operations.

S110: Acquiring a first table structure information of a target database, and acquiring graph data to be processed and a second table structure information of the graph data to be processed from a preset data pool.

In the present disclosure, the target database is a graph database, the data pool can be understood as a data warehouse, and the graph data in the data warehouse is aggregated from various data sources.

In the present disclosure, the first table structure information of the target database can be understood as a schema of the target database, and the specific contents of the schema of different target databases are different. The present disclosure exemplarily gives a specific content of a schema of the target graph database. The sample content of the schema is as follows:

```
{
  "edgeList ": [
    {
      "startNodeName": "Person",// start node name
      "endNodeName": "Company" ,// end node name
      "name": "WORK IN" ,// edge name
      "properties": [// attribute
        {
          "dataType": "String" ,// attribute field type, including number, string, date, etc.
          "description": "role" ,// attribute description
          "name": "role" // attribute name
        }
      ]
    }
  ],
  "nodeList ": [
```

```
        {
            "name": "Person" ,// node name
            "properties": ]// format of node attribute, same as format of
edge attribute
                { }
            ],
            "uniqueProperties": ]// unique key attribute
                "id"
            ]
        }
    ]
}
```

In the present disclosure, the second table structure information may include a mapping table corresponding to the first table structure information, and similarly, the present disclosure exemplarily gives specific contents of the mapping table in the second table structure information. The sample content of the mapping table is as follows:

```
{
    "nodes ": [
        {
            "name": "Company ",
            "query": "select name from graph_bc .company_not_repeat",//
data warehouse
            "mode": "INSERT ",
            "mapping": {//mapping of field names in graph database and
data warehouse attributes
                "name": "name"
            }
        }
    ],
    "relations": [ ]
}
```

S120: Comparing the first table structure information with the second table structure information, and determining whether the graph data to be processed meets a list fusion condition.

If the graph data to be processed meets the list fusion conditions, proceed to S130.

If the graph data to be processed does not meet the list fusion condition, proceed to S170.

S130: Fusing the graph data to be processed to obtain a target list.

In the present disclosure, the target list includes multiple graph data nodes and multiple node edges.

S140: Determining whether there is an outlier in the target list according to the graph data nodes and the node edges in the target list.

In the present disclosure, the outlier includes at least one of a first outlier configured to characterize node degrees of the graph data nodes and a second outlier configured to characterize numbers of members of connected graphs of the graph data to be processed. If there is no outlier in the target list, proceed to S150. If there is an outlier in the target list, proceed to S160.

S150: Importing the graph data to be processed into the target database.

S160: Comparing the graph data to be processed in the target database with the graph data to be processed in the preset data pool, and generating a graph data quality report according to a comparison result.

S170: Generating a graph data quality report and reporting an error.

In the present disclosure, the graph data quality report can be presented in many ways, for example, it can be presented in the form of a graph or in the form of a list. Further, the graph data quality report includes the comparison results of the graph data to be processed in the target database and the graph data to be processed in the preset data pool at multiple levels including a number of graph data nodes, an data amount of node edges, a connection relationship of the graph data nodes and a null rate of the node attribute of the graph data nodes.

It can be understood that the graph data quality report can not only reflect whether there are errors or exceptions in the process of importing the graph data to be processed into the target graph database, it can also reflect the error information of the graph data to be processed before it is imported into the target graph database. For example, it can record in the graph quality report that the data to be processed does not meet the list fusion condition or there is an outlier in the target list. In this way, the complete and accurate quality verification results of the graph data to be processed can be displayed.

It is understandable that when applying the method described in S110-S160 above, by comparing the obtained first table structure information with the second table structure information in advance to determine whether the obtained data to be processed meets the list fusion condition, and fusing the graph data to be processed to obtain the target list when the list fusion condition is met, the quality verification of the graph data to be processed can be carried out before importing the graph data to be processed to the target graph database, thereby avoiding generating a target list based on the graph data to be processed with errors.

By determining whether there is an outlier in the target list, the abnormal graph data in the graph data to be processed can be detected to ensure the correctness of the graph data to be processed imported into the target graph database. By generating a graph data quality report, it is possible to verify whether the graph data to be processed has errors during the import process.

In this way, the verification of data quality can be realized before importing the graph data to be processed and during the process of importing the graph data to be processed, so as to avoid repeated import and cleaning of the graph data to be processed, thereby improving the efficiency of building the graph database and ensure the quality of the graph data in the graph database.

In a specific example, in order to accurately and comprehensively determine whether the graph data to be processed meets the list fusion condition, S120 described to determine whether the graph data to be processed meets the list fusion condition, which can be determined specifically by field type consistency, field uniqueness and identification information integrity. The above three judgment logic can be synchronized, can also be carried out in turn, the following explains the way to judge in turn.

Firstly, comparing whether a first field type of a table node in the first table structure information is consistent with a second field type of a table node in the second table structure information. In a determination that the first field type is consistent with the second field type, further determining whether a field of each table node in the first table structure information is unique in the second table structure information.

Secondly, in a determination that the field of each table node in the first table structure information is unique in the second table structure information, querying whether there are a first identification information of a start node of the graph data to be processed and a second identification information of an end node of the graph data to be processed in the first table structure information. In a determination that there are the first identification information of the start node of the graph data to be processed and the second identification information of the end node of the graph data to be processed in the first table structure information, determining that the graph data to be processed meets the list fusion condition.

In this solution, field types can include types such as Number and String. When performing field uniqueness verification, it is verified whether the fields of each table node are unique in the data warehouse based on the uniqueProperties in the Schema. The determination of field uniqueness can not only speed up the subsequent import of the graph data to be processed into the target graph database, but also ensure that the subsequent nodes can be associated normally.

It is understandable that by judging whether the graph data to be processed meets the list fusion condition from the three levels of field type consistency, field uniqueness, and identification information integrity, it can ensure the accuracy and comprehensiveness of the judgment results and avoid importing the problematic graph data to be processed into the target graph database.

It can be understood that if one of the above three judgment conditions is not satisfied, it can be determined that the graph data to be processed does not meet the list fusion condition. Further, when the graph data to be processed does not meet the list fusion condition, the method may further include the following two processing methods, certainly, in the specific implementation, it is not limited to the following two methods.

According to a first processing method, generating an error prompt message to indicate that there is an error in the graph data to be processed.

For example, error prompt information can be recorded in the graph data quality report. In this way, it can be learned that the graph data to be processed has errors before importing through the graph data quality report.

According to a second processing method, executing a pre-configured automatic repair script to repair the graph data to be processed.

For example, a pre-configured repair script can be executed to modify the second field type in the graph data to be processed, and the identification information corresponding to the graph data to be processed can also be modified to the identification information existing in the first table structure information. For example, the identification information configured to characterize the start node in the first table structure information is g1, and the identification information configured to characterize the end node is g2, assuming that the first identification information of the start node corresponding to the graph data to be processed is g3, and the second identification information of the end node is g4, in this case, g3 can be modified to g1, and g4 can be modified to g2.

It is understandable that after the database of the graph data to be processed is repaired, the repaired graph data to be processed can be fused to obtain a target list.

In specific implementation, in order to accurately determine whether there is an outlier in the target list, S140 described to determine whether there is an outlier in the target list according to the graph data nodes and the node edges in the target list, specifically can be implemented in the following two methods. The following two methods respectively correspond to the determination of the first outlier and the determination of the second outlier.

The first method to determine the outlier of the target list is described below.

Firstly, determining a cumulative value of node edges corresponding to each graph data node in the target list, and taking the cumulative value as a node degree of each graph data node. According to an order of the node degrees from large to small, sorting the graph data nodes to obtain a sorting result of the graph data nodes.

In the present disclosure, the degree center algorithm can be used to calculate the node degree of each graph data node.

Secondly, dividing the graph data nodes in the target list according to a set proportion and the sorting result of the graph data nodes, and obtaining a first graph data node set and a second graph data node set.

In the present disclosure, the first graph data node set includes multiple sorted top graph data nodes, and the second graph data node set includes multiple sorted back graph data nodes. For example, the set proportion may be 10%, then the first graph data node set may be a set formed by graph nodes corresponding to the top 10% of node degrees in the sorting result of graph nodes, and the second graph data node set may be a set formed by graph nodes corresponding to the last 90% of node degrees in the sorting result of graph nodes.

Then, calculating an average node degree corresponding to the second graph data node set.

Finally, determining whether a first ratio between a minimum node degree in the first graph data node set and the average node degree reaches a set ratio, in a determination that the first ratio between the minimum node degree in the first graph data node set and the average node degree reaches the set ratio, determining that there is the first outlier in the target list.

For example, the average node degree may be 5, and the set ratio may be 1000. Assuming that the minimum node degree in the first graph data node set is 6000, the first ratio is determined to be 1200. In this case, it can be determined that there is a first outlier in the target list.

Optionally, when determining whether there is a first outlier in the target list, it can also be achieved by determining whether the first ratio between the first graph data node set and the average node degree reaches a target node degree of the set ratio. For example, if there is a target node degree in the first graph data node set, it is determined that there is a first outlier in the target list.

The second method to determine the outlier of the target list is described below.

Firstly, generating multiple connected graphs corresponding to the target list according to each graph data node in the target list and node edges corresponding to the each graph data node, and calculating a number of members of each connected graph.

In the present disclosure, each connected graph includes multiple graph data nodes, and the multiple graph data nodes in each connected graph are connected by node edges; and the number of members is a number of graph data nodes in each connected graph.

Secondly, sorting the connected graphs in an order of the number of members from large to small to obtain a sorting result of the connected graphs.

Then, dividing the connected graphs according to a set proportion and the sorting result of the connected graphs, and obtaining a first connected graph set and a second connected graph set.

In the present disclosure, the first connected graph set includes multiple sorted top connected graphs, and the second connected graph set includes multiple sorted back connected graphs. For example, the set proportion may be 10%, then the first connected graph set may be a set formed by connected graphs corresponding to the top 10% of number of members in the sorting result of connected graphs, and the second connected graph set may be a set formed by connected graphs corresponding to the last 90% of number of members in the sorting result of connected graphs.

Further, calculating an average number of members corresponding to the second connected graph set.

Finally, determining whether a second ratio between a minimum number of members in the first connected graph set and the average number of members reaches a set ratio, in a determination that the second ratio between the minimum number of members in the first connected graph set and the average number of members reaches the set ratio, determining that there is the second outlier in the target list.

For example, the average number of members may be 8, and the set ratio may be 1000. Assuming that the minimum number of members in the first connected graph set is 8000, the second ratio is determined to be 1000. In this case, it can be determined that there is a second outlier in the target list.

Optionally, when determining whether there is a second outlier in the target list, it can also be achieved by determining whether the second ratio between the first connected graph set and the average number of members reaches a target number of members of the set ratio. For example, if there is a target number of members in the first connected graph set, it is determined that there is a second outlier in the target list.

Through the content described in the above operations, it is possible to accurately determine whether there is an outlier in the target list.

Figure 2:
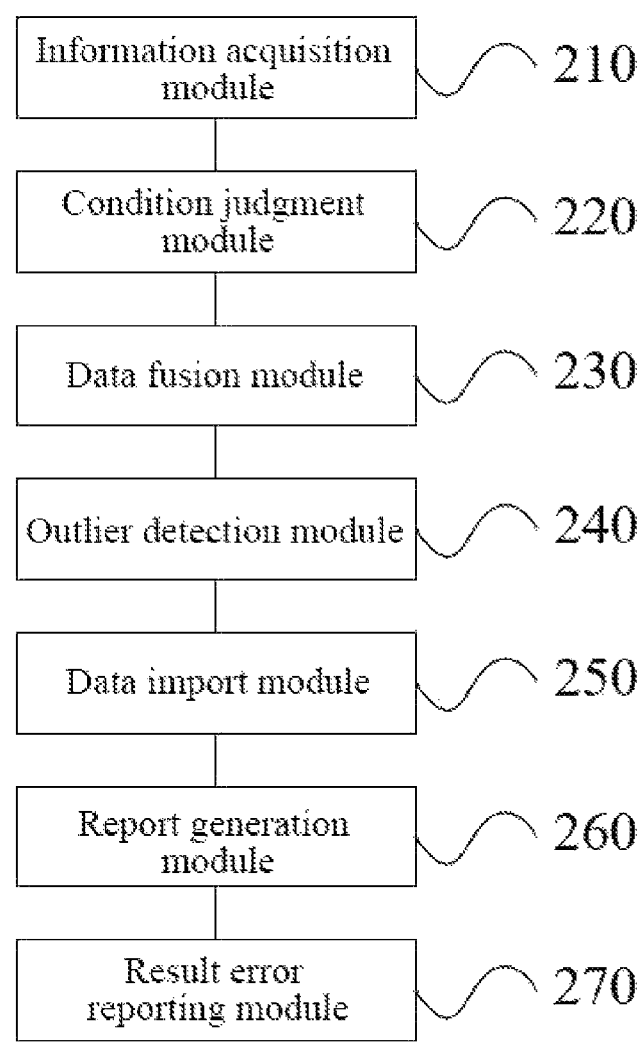
FIG. 2 is a block diagram of a device for graph data quality verification according to an embodiment of the present disclosure.

On the basis of the above, FIG. 2 provides a block diagram of a device for graph data quality verification 200 corresponding to the above method for graph data quality verification. The device for graph data quality verification 200 includes an information acquisition module 210, a condition judgment module 220, a data fusion module 230, an outlier detection module 240, a data import module 250 and a report generation module 260.

The information acquisition module 210 is configured for acquiring a first table structure information of a target database, and acquiring graph data to be processed and a second table structure information of the graph data to be processed from a preset data pool, where the target database is a graph database.

The condition judgment module 220 is configured for comparing the first table structure information with the second table structure information, and determining whether the graph data to be processed meets a list fusion condition.

The data fusion module 230 is configured for in a determination that the graph data to be processed meets the list fusion condition, fusing the graph data to be processed to obtain a target list, where the target list includes graph data nodes and node edges.

The outlier detection module 240 is configured for determining whether there is an outlier in the target list according to the graph data nodes and the node edges in the target list, where the outlier includes at least one of a first outlier configured to characterize node degrees of the graph data nodes and a second outlier configured to characterize numbers of members of connected graphs of the graph data to be processed.

The data import module 250 is configured for in a determination that there is no outlier in the target list, importing the graph data to be processed into the target database.

The report generation module 260 is configured for comparing the graph data to be processed in the target database with the graph data to be processed in the preset data pool, and generating a graph data quality report according to a comparison result.

A result error reporting module 270 is configured for in a determination that the data to be processed does not meet the list fusion condition or there is an outlier in the target list, generating a graph data quality report and reporting an error.

Optionally, the condition judgment module 220 is specifically configured for:

comparing whether a first field type of a table node in the first table structure information is consistent with a second field type of a table node in the second table structure information;

in a determination that the first field type is consistent with the second field type, determining whether a field of each table node in the first table structure information is unique in the second table structure information;

in a determination that the field of each table node in the first table structure information is unique in the second table structure information, querying whether there are a first identification information of a start node of the graph data to be processed and a second identification information of an end node of the graph data to be processed in the first table structure information; and in a determination that there are the first identification information of the start node of the graph data to be processed and the second identification information of the end node of the graph data to be processed in the first table structure information, determining that the graph data to be processed meets the list fusion condition.

Optionally, the outlier detection module 240 is specifically configured for:

determining a cumulative value of node edges corresponding to each graph data node in the target list, and taking the cumulative value as a node degree of each graph data node;

according to an order of the node degrees from large to small, sorting the graph data nodes to obtain a sorting result of the graph data nodes;

dividing the graph data nodes in the target list according to a set proportion and the sorting result of the graph data nodes, and obtaining a first graph data node set and a second graph data node set, where the first graph data node set includes multiple sorted top graph data nodes, and the second graph data node set includes multiple sorted back graph data nodes;

calculating an average node degree corresponding to the second graph data node set;

and determining whether a first ratio between a minimum node degree in the first graph data node set and the average node degree reaches a set ratio, in a determination that the first ratio between the minimum node degree in the first graph data node set and the average node degree reaches the set ratio, determining that there is the first outlier in the target list.

Optionally, the outlier detection module 240 is specifically configured for:

generating connected graphs corresponding to the target list according to each graph data node in the target list and node edges corresponding to the each graph data node, where each connected graph includes multiple graph data nodes, and the multiple graph data nodes in each connected graph are connected by node edges;

calculating a number of members of each connected graph, where the number of members is a number of graph data nodes in each connected graph;

sorting the connected graphs in an order of the number of members from large to small to obtain a sorting result of the connected graphs;

dividing the connected graphs according to a set proportion and the sorting result of the connected graphs, and obtaining a first connected graph set and a second connected graph set, where the first connected graph set includes multiple sorted top connected graphs, and the second connected graph set includes multiple sorted back connected graphs;

calculating an average number of members corresponding to the second connected graph set; and determining whether a second ratio between a minimum number of members in the first connected graph set and the average number of members reaches a set ratio, in a determination that the second ratio between the minimum number of members in the first connected graph set and the average number of members reaches the set ratio, determining that there is the second outlier in the target list.

For the description of the above information acquisition module 210, condition judgment module 220, data fusion module 230, outlier detection module 240, data import module 250, report generation module 260 and result error reporting module 270, please refer to the description of the operations of the method shown in FIG. 1.

Figure 3:
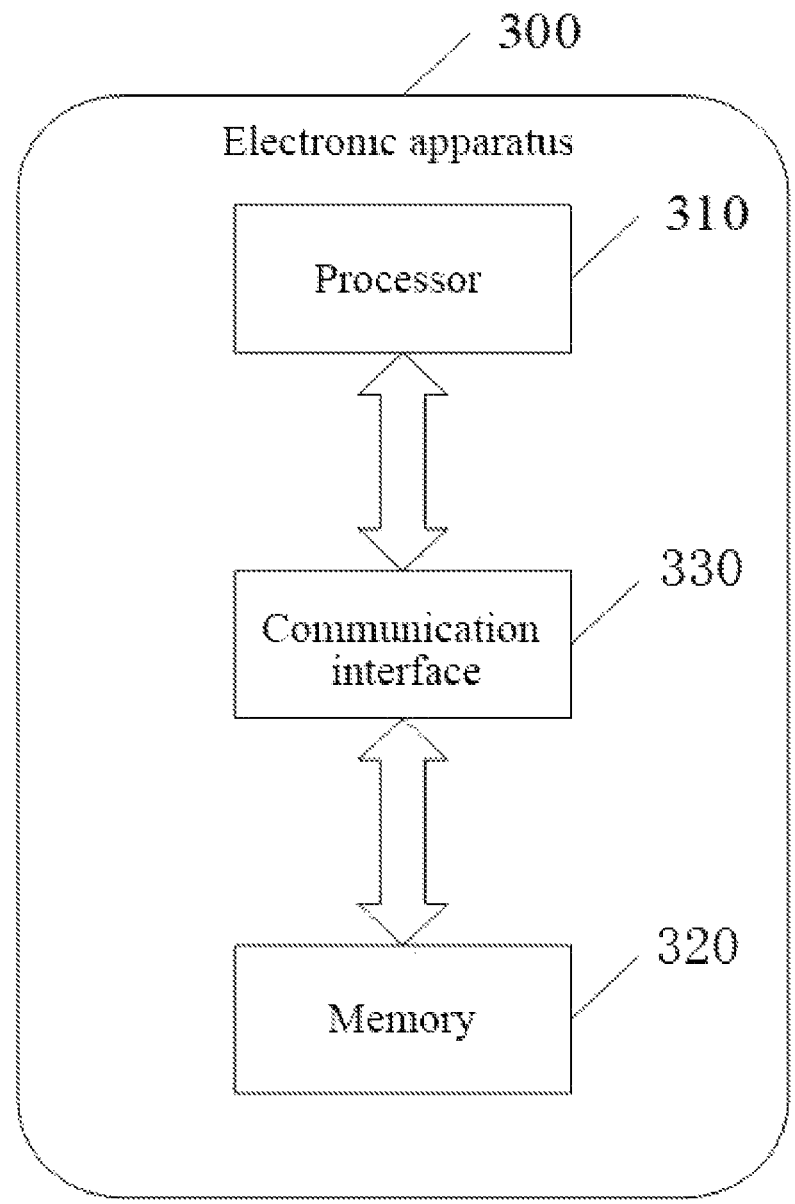
FIG. 3 is a schematic diagram of connections of hardware structures of an electronic apparatus in which the device for graph data quality verification is located according to an embodiment of the present disclosure.

On the basis of the above, FIG. 3 provides a schematic diagram of a hardware structure of an electronic apparatus 300 in which the device 200 for graph data quality verification is located of the present disclosure.

The electronic apparatus 300 includes a processor 310 and a memory 320, and the processor 310 and the memory 320 are connected through a communication interface 330. The processor 310 retrieve computer program from the memory 320 through the communication interface 330, and implement the above-mentioned method for graph data quality verification by executing the computer program.

In summary, according to the method and device for graph data quality verification provided by the present disclosure, by comparing the obtained first table structure information with the second table structure information in advance to determine whether the obtained data to be processed meets the list fusion condition, and fusing the graph data to be processed to obtain the target list when the list fusion condition is met, the quality verification of the graph data to be processed can be carried out before importing the graph data to be processed to the target graph database, thereby avoiding generating a target list based on the graph data to be processed with errors.

By determining whether there is an outlier in the target list, the abnormal graph data in the graph data to be processed can be detected to ensure the correctness of the graph data to be processed imported into the target graph database. By generating a graph data quality report, it is possible to verify whether the graph data to be processed has errors during the import process.

In this way, the verification of data quality can be realized before importing the graph data to be processed and during the process of importing the graph data to be processed, so as to avoid repeated import and cleaning of the graph data to be processed, thereby improving the efficiency of building the graph database and ensure the quality of the graph data in the graph database. In addition, by executing a pre-configured automatic repair script to repair the graph data to be processed, the development workload can be reduced.

The above are only some embodiments of the present disclosure and are not used to limit the present disclosure. For those skilled in the art, the present disclosure may have various changes and variations. Any modification, equivalent replacement, improvement, etc. made within the spirit and principle of the present disclosure shall be included in the scope of the claims of the present disclosure.

What is claimed is:

1. A method for graph data quality verification, comprising:

acquiring a first table structure information of a target database, and acquiring graph data to be processed and a second table structure information of the graph data to be processed from a preset data pool, wherein the target database is a graph database;

comparing the first table structure information with the second table structure information and determining that the graph data to be processed meets a list fusion condition, fusing the graph data to be processed to obtain a target list, wherein the target list comprises graph data nodes and node edges;

determining that there is no outlier in the target list according to the graph data nodes and the node edges in the target list, importing the graph data to be processed into the target database, wherein the outlier comprises at least one of a first outlier configured to characterize node degrees of the graph data nodes and a second outlier configured to characterize numbers of members of connected graphs of the graph data to be processed; and comparing the graph data to be processed in the target database with the graph data to be processed in the preset data pool, and generating a graph data quality report according to a comparison result;

wherein, comparing the first table structure information with the second table structure information and determining that the graph data to be processed meets a list fusion condition comprises:

comparing a first field type of a table node in the first table structure information and a second field type of a table node in the second table structure information;

determining that the first field type is consistent with the second field type, and a field of each table node in the first table structure information is unique in the second table structure information;

querying that there are a first identification information of a start node of the graph data to be processed and a second identification information of an end node of the graph data to be processed in the first table structure information; and determining that the graph data to be processed meets the list fusion condition;

wherein, determining that there is no outlier in the target list according to the graph data nodes and the node edges in the target list comprises:

determining a cumulative value of node edges corresponding to each graph data node in the target list, and taking the cumulative value as a node degree of each graph data node;

according to an order of the node degrees from large to small, sorting the graph data nodes to obtain a sorting result of the graph data nodes;

dividing the graph data nodes in the target list according to a set proportion and the sorting result of the graph data nodes, and obtaining a first graph data node set and a second graph data node set, wherein the first graph data node set comprises multiple sorted top graph data nodes, and the second graph data node set comprises multiple sorted back graph data nodes;

calculating an average node degree corresponding to the second graph data node set; and determining that a first ratio between a minimum node degree in the first graph data node set and the average node degree does not reach a set ratio, determining that there is no outlier in the target list.

2. A method for graph data quality verification, comprising:

acquiring a first table structure information of a target database, and acquiring graph data to be processed and a second table structure information of the graph data to be processed from a preset data pool, wherein the target database is a graph database;

comparing the first table structure information with the second table structure information and determining that the graph data to be processed meets a list fusion condition, fusing the graph data to be processed to obtain a target list, wherein the target list comprises graph data nodes and node edges;

determining that there is no outlier in the target list according to the graph data nodes and the node edges in the target list, importing the graph data to be processed into the target database, wherein the outlier comprises at least one of a first outlier configured to characterize node degrees of the graph data nodes and a second outlier configured to characterize numbers of members of connected graphs of the graph data to be processed; and comparing the graph data to be processed in the target database with the graph data to be processed in the preset data pool, and generating a graph data quality report according to a comparison result;

wherein, comparing the first table structure information with the second table structure information and determining that the graph data to be processed meets a list fusion condition comprises:

comparing a first field type of a table node in the first table structure information and a second field type of a table node in the second table structure information;

determining that the first field type is consistent with the second field type, and a field of each table node in the first table structure information is unique in the second table structure information;

querying that there are a first identification information of a start node of the graph data to be processed and a second identification information of an end node of the graph data to be processed in the first table structure information; and determining that the graph data to be processed meets the list fusion condition;

wherein, determining that there is no outlier in the target list according to the graph data nodes and the node edges in the target list comprises:

generating connected graphs corresponding to the target list according to each graph data node in the target list and node edges corresponding to the each graph data node, wherein each connected graph comprises multiple graph data nodes, and the multiple graph data nodes in each connected graph are connected by node edges;

calculating a number of members of each connected graph, wherein the number of members is a number of graph data nodes in each connected graph;

sorting the connected graphs in an order of the number of members from large to small to obtain a sorting result of the connected graphs;

dividing the connected graphs according to a set proportion and the sorting result of the connected graphs, and obtaining a first connected graph set and a second connected graph set, wherein the first connected graph set comprises multiple sorted top connected graphs, and the second connected graph set comprises multiple sorted back connected graphs;

calculating an average number of members corresponding to the second connected graph set; and determining that a second ratio between a minimum number of members in the first connected graph set and the average number of members does not reach a set ratio, determining that there is no outlier in the target list.

3. A device for graph data quality verification, comprising one or more processors and a non-transitory program storage medium storing program code executable by the one or more processors, the program code, when executed by the one or more processors, implements the following operations:

acquiring a first table structure information of a target database, and acquiring graph data to be processed and a second table structure information of the graph data to be processed from a preset data pool, wherein the target database is a graph database;

comparing the first table structure information with the second table structure information and determining that the graph data to be processed meets a list fusion condition, fusing the graph data to be processed to obtain a target list, wherein the target list comprises graph data nodes and node edges;

determining that there is no outlier in the target list according to the graph data nodes and the node edges in the target list, importing the graph data to be processed into the target database, wherein the outlier comprises at least one of a first outlier configured to characterize node degrees of the graph data nodes and a second outlier configured to characterize numbers of members of connected graphs of the graph data to be processed; and comparing the graph data to be processed in the target database with the graph data to be processed in the preset data pool, and generating a graph data quality report according to a comparison result;

wherein, comparing the first table structure information with the second table structure information and determining that the graph data to be processed meets a list fusion condition comprises:

comparing a first field type of a table node in the first table structure information and a second field type of a table node in the second table structure information;

determining that the first field type is consistent with the second field type, and a field of each table node in the first table structure information is unique in the second table structure information;

querying that there are a first identification information of a start node of the graph data to be processed and a second identification information of an end node of the graph data to be processed in the first table structure information; and determining that the graph data to be processed meets the list fusion condition;

wherein, determining that there is no outlier in the target list according to the graph data nodes and the node edges in the target list comprises:

determining a cumulative value of node edges corresponding to each graph data node in the target list, and taking the cumulative value as a node degree of each graph data node;

according to an order of the node degrees from large to small, sorting the graph data nodes to obtain a sorting result of the graph data nodes;

dividing the graph data nodes in the target list according to a set proportion and the sorting result of the graph data nodes, and obtaining a first graph data node set and a second graph data node set, wherein the first graph data node set comprises multiple sorted top graph data nodes, and the second graph data node set comprises multiple sorted back graph data nodes;

calculating an average node degree corresponding to the second graph data node set; and determining that a first ratio between a minimum node degree in the first graph data node set and the average node degree does not reach a set ratio, determining that there is no outlier in the target list.

\* \* \* \* \*